United States Patent Office 3,006,247
Patented Oct. 31, 1961

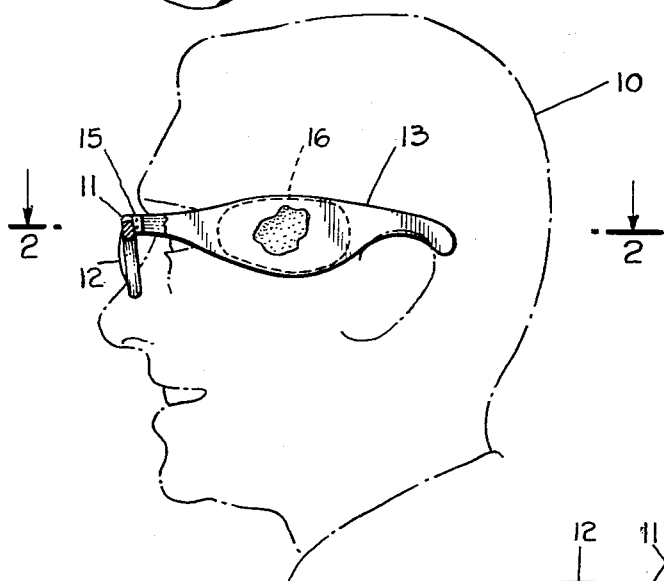
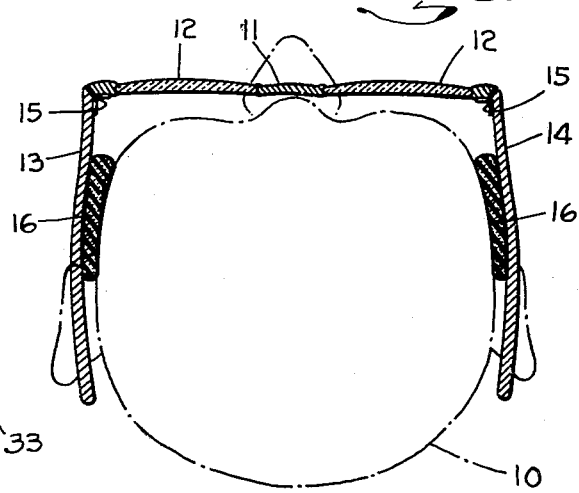
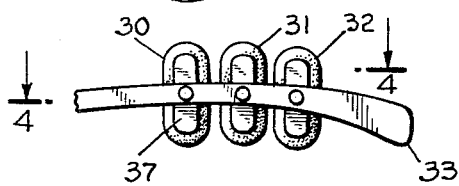
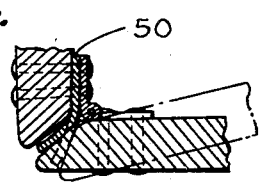
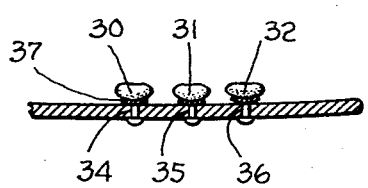
INVENTOR.
JEANNETTE DAVIS

3,006,247
EYEGLASS ASSEMBLY WITH PAD-BEARING BOWS
Jeannette Davis, 1211 Selby Ave., Los Angeles, Calif.
Filed Aug. 17, 1959, Ser. No. 834,006
4 Claims. (Cl. 88—52)

This invention relates to eyeglasses, and more particularly to an improved construction thereof whereby the eyeglasses frame is held out of contact with the nose.

Eyeglasses commonly consist of a frame holding a lens portion, the frame being attached to the head of the wearer by two laterally extending bows, which generally are attached to hook over the ears of the wearer. The traditional construction of eyeglasses calls for most of the weight of the frame to be borne by the bridge of the nose. This is a disadvantage in many cases such as for example where the eyeglass frames or the lenses therein are especially heavy, or where the bridge of the nose of the wearer is especially sensitive. In any case, unsightly depressions are nearly always left in the bridge of the nose for some time after the eyeglasses are removed.

It is an object of the present invention to provide an improved construction for eyeglasses so as to keep them from any contact at all with the nose of the wearer.

Another object of the invention is to provide an eyeglass construction which is highly resistant to the glasses being shifted around when worn.

Other objects of the invention will become apparent as the description thereof proceeds.

In the drawings,

FIGURE 1 is a side view of one embodiment of my invention, in place on a wearer.

FIGURE 2 is a sectional view, taken from above at the level shown by the arrows in FIGURE 1.

FIGURE 3 shows an alternative construction of the inventive device.

FIGURE 4 is a sectional view taken as indicated by the indicia on FIGURE 3.

FIGURE 5 shows an alternative construction of the articulation of bows and frame.

Coming now to FIGURES 1 and 2, which is the best embodiment of my invention, and the one which I prefer, these show the head of a wearer 10, to which is attached my inventive eyeglasses which comprise a frame portion 11 containing a pair of lenses 12, and two bows 13 and 14 which are joined to the ends of the frame by hinge means 15. As will be noted particularly from FIGURE 1, the central portion of each bow 13 and 14 is considerably widened compared to the usual eyeglasses, and this widened portion serves as a backing for pads 16. In the preferred embodiment shown in FIGURES 1 and 2, the bows also extend far back enough so as to rest on the ears of the wearer.

The pads 16 are made of a material having some resilience and presenting a surface, on the side contacting the temples of the wearer, of a character which has a substantial coefficient of friction against normal human skin. Suitable pad material includes ordinary sponge rubber, both natural and synthetic; felt, such as felted wool, felted synthetic cotton, felted synthetic fibers such as Orlon and nylon, and foamed plastics, particularly those which have some resilience or elastomeric character, such as foamed polyethylene, foamed polyesters, foamed polyisocyanates, and the like. The best material which I know of for use in my invention is foamed natural rubber, although the foamed synthetic elastomers are almost equally suitable. The pads may also be of a composite nature, such as layer of foamed plastic cemented to a layer of felted wool, the wool being on the side contacting the wearer, and the plastic being cemented to the bows 13 and 14.

It is essential in the practice of my invention to provide a sufficient contact surface on the temples of the wearer so that any tendency of the eyeglasses to shift about is overcome by the frictional resistance. I find that a minimum pad area for each bow, that is for each temple of the wearer, is about 4 square centimeters. It is essential, also, that the coefficient of friction of the surface of the pad which contacts the skin of the wearer be substantial. The materials enumerated have a coefficient of friction against normal human skin of at least 0.35. On the other hand, perfectly smooth surfaces, such as polished metal, Celluloid and the like, have coefficients of friction of about 0.1 to 0.2 under similar circumstances. "Human skin" here means not only bare skin but skin covered with hair, as exists in part on the normal human temple.

The provision of an extended contact surface of at least 4 square centimeters on each side, together with a material having a substantial coefficient of friction, results in a clamping effect of such a nature that the eyeglasses resist any tendency for the frame part to move downwards, with rotation about the pad. Otherwise stated, when the eyeglasses of my invention are put in place by the user, they remain where placed, because of the friction provided. This is completely different from the prior art, for example Petterson Patent No. 1,854,060, in which the patentee counterbalances the weight of the frame by weighing the ear portions of the bows, with rotation possible about the temple contacts.

An alternative method of providing a total pad contact area at least equal to the minimum which I have found to be necessary, and which may be preferred by some wearers, is shown in FIGURE 3, wherein a series of small pads 30, 31 and 32 are fixed to a relatively narrow bow 33. By providing studs of oval cross section 34, 35 and 36 which are somewhat loose fitting in perforations in the bow 33, slight rotation of the individual pads is possible, which permits the array of pads to conform automatically to variations in contour of the temple of the wearer. In the embodiment shown in FIGURES 3 and 4, the bow 33 may be of the "tortoise shell" plastic commonly used in this art, the studs 34, 35 and 36 with integral metal backings 37 may be made of a suitable material such as solid nylon plastic, and the pad portion proper 30, 31 and 32 may be made of one of the materials named, such as for example foamed polyethylene.

In most cases a simple hinge 15 such as is commonly used in the eyeglass art is sufficient. In order to make a given pair of glasses adaptable to a variety of head widths, without the necessity of bending the bows 13 and 14, a spring means 50 may be incorporated in the hinge as appears in FIGURE 5, which is a horizontal cross section of the articulation between bow and frame. The uncompressed configuration of the spring 50 is as shown by the dotted portion in the figure. When the eyeglasses are put on, the leaf spring 50 is put into compression and caused to take the configuration shown by the solid lines in FIGURE 5. This construction also has the advantage of increasing the force with which the pads are pressed against the temples of the wearer, while at the same time enabling the glasses to be removed conveniently.

It will be seen that the invention accomplished its objects, in that a device, and several alternative modes of construction therefore, has been disclosed which enables eyeglasses to grip the temples so as to free the bridge of the nose from the necessity of contact with the frame.

The lens portion of the eyeglasses may be any of the transparent materials commonly used in this art. Where the invention is applied to ordinary glasses containing a correction for faulty vision, the lenses will normally be made of ground and polished glass. Where sunglasses or the like are concerned, the lenses may be ground and polished glass or blown glass, or tinted transparent plastic, such as polymethylmethacrylate. The frames may completely enclose the lens portion or the frame may be of a single bar construction, from which the lens portion depends. It will be understood, accordingly, that the term "lens" or "lenses" used herein and in the claims which follow should be construed broadly, indeed as is usual in this art.

The material of construction of the frames and bows again may be any of the materials usual in this art, such as various plastics, plastics reinforced with wires or bars of metal, or the frames or bows or bow may be of cast or forged metal, particularly of the lighter alloys such as those of aluminum and magnesium.

It will be understood that although specific embodiments have been described by way of explanation and example, my invention is a broad one and is capable of numerous modifications, all within the broad scope of the invention.

Having described the invention, I claim:

1. Eyeglasses comprising a frame containing lenses, two bows attached to said frame for contacting the temples of the wearer, each of said bows bearing at least one pad on its inner side having an extended surface of frictional coefficient against normal human skin of at least 0.35 and thus presenting a contact surface for the temples of the wearer of sufficient magnitude to prevent by frictional resistance any rotation of said frames about said pads, whereby the said eyeglasses may be worn with said frame out of contact with the nose of the wearer.

2. Eyeglasses comprising a frame containing lenses, two bows attached to said frame for contacting the temples of the wearer, each of said bows bearing at least one pad on its inner side having a contact surface of frictional coefficient against normal human skin of at least 0.35 and thus presenting a contact surface for the temples of the wearer of sufficient magnitude to prevent by frictional resistance any rotation of said frames about said pads, whereby the said eyeglasses may be worn with said frame out of contact with the nose of the wearer.

3. Eyeglasses comprising a frame containing lenses, two bows attached to said frame for contacting the temples of the wearer, each of said bows bearing a series of spaced pads on its inner side each of which has an extended surface of substantial frictional coefficient against human skin and thus presenting a contact surface for the temples of the wearer of sufficient magnitude to prevent by frictional resistance any rotation of said frames about said pads, whereby the said eyeglasses may be worn with said frame out of contact with the nose of the wearer.

4. Eyeglasses comprising a frame containing lenses, two bows attached to said frame for contacting the temples of the wearer, each of said bows bearing at least one pad on its inner side having an extended surface of a foamed elastomer and thus presenting a contact surface for the temples of the wearer of sufficient magnitude to prevent by frictional resistance any rotation of said frames about said pads, whereby the said eyeglasses may be worn with said frame out of contact with the nose of the wearer.

References Cited in the file of this patent

UNITED STATES PATENTS

| 305,944 | Marsh | Sept. 30, 1884 |
| 347,738 | Pyle | Aug. 17, 1886 |
| 508,457 | Wickliffe | Nov. 14, 1893 |
| 1,719,957 | Arrick | July 9, 1929 |
| 2,267,288 | Rooke | Dec. 23, 1941 |

FOREIGN PATENTS

| 347,738 | Great Britain | Aug. 17, 1886 |